United States Patent
Zhang et al.

(10) Patent No.: US 12,512,464 B2
(45) Date of Patent: Dec. 30, 2025

(54) POSITIVE ELECTRODE MATERIAL USED FOR LITHIUM ION BATTERY, PREPARATION METHOD THEREFOR, AND LITHIUM ION BATTERY

(71) Applicant: SVOLT ENERGY TECHNOLOGY CO., LTD., Changzhou (CN)

(72) Inventors: Shutao Zhang, Changzhou (CN); Jinxin Zhu, Changzhou (CN); Yan Bai, Changzhou (CN); Hailong Pan, Changzhou (CN); Zhuang Wang, Changzhou (CN)

(73) Assignee: SVolt Energy Technology Co., Ltd., Changzhou (CN)

( * ) Notice: Subject to any disclaimer, the term of this patent is extended or adjusted under 35 U.S.C. 154(b) by 869 days.

(21) Appl. No.: 17/785,872

(22) PCT Filed: Oct. 27, 2020

(86) PCT No.: PCT/CN2020/123858
§ 371 (c)(1),
(2) Date: Jun. 15, 2022

(87) PCT Pub. No.: WO2021/243928
PCT Pub. Date: Dec. 9, 2021

(65) Prior Publication Data
US 2023/0026588 A1    Jan. 26, 2023

(30) Foreign Application Priority Data

Jun. 1, 2020   (CN) .......................... 202010485860.4

(51) Int. Cl.
| | |
|---|---|
| *H01M 4/36* | (2006.01) |
| *H01M 4/04* | (2006.01) |
| *H01M 4/485* | (2010.01) |
| *H01M 4/505* | (2010.01) |
| *H01M 4/525* | (2010.01) |
| *H01M 10/0525* | (2010.01) |
| *H01M 4/02* | (2006.01) |

(52) U.S. Cl.
CPC ......... *H01M 4/366* (2013.01); *H01M 4/0471* (2013.01); *H01M 4/485* (2013.01); *H01M 4/505* (2013.01); *H01M 4/525* (2013.01); *H01M 10/0525* (2013.01); *H01M 2004/021* (2013.01); *H01M 2004/028* (2013.01)

(58) Field of Classification Search
CPC .... H01M 4/0471; H01M 4/366; H01M 4/362; H01M 4/505; H01M 4/525; H01M 4/131; H01M 4/1391
See application file for complete search history.

(56) References Cited

U.S. PATENT DOCUMENTS

| | | | |
|---|---|---|---|
| 2020/0112024 A1 | 4/2020 | Shin et al. | |
| 2020/0136126 A1 | 4/2020 | Hong et al. | |

FOREIGN PATENT DOCUMENTS

| | | | |
|---|---|---|---|
| CN | 105280893 | A | 1/2015 |
| CN | 105185962 | A | 12/2015 |
| CN | 105449196 | A | 3/2016 |
| CN | 106207130 | A | 12/2016 |
| CN | 106532006 | A | 3/2017 |
| CN | 106953070 | A | 7/2017 |
| CN | 108023077 | A | 5/2018 |
| CN | 109037613 | A | 12/2018 |
| CN | 109192950 | A | 1/2019 |
| CN | 109428074 | A | 3/2019 |
| CN | 109980219 | A | 7/2019 |
| CN | 110010889 | A | 7/2019 |
| CN | 110165168 | A | 8/2019 |
| CN | 111106328 | A1 | 5/2020 |
| JP | 2020-061360 | A | 4/2020 |
| KR | 10-2018-0116928 | B1 | 10/2018 |

OTHER PUBLICATIONS

Extended European Search Report dated Oct. 27, 2023, in connection with European Application No. 20939439.4.
Chinese Office Action dated Jul. 5, 2022, in connection with Chinese Application No. 202010485860.4.
International Search Report mailed Sep. 23, 2021, in connection with International Application No. PCT/CN2020/123858.
Japanese Notice of Reasons for Refusal dated Apr. 28, 2023, in connection with Japanese Patent Application No. 2022-521167.

*Primary Examiner* — Basia A Ridley
*Assistant Examiner* — Heng M. Chan
(74) *Attorney, Agent, or Firm* — Wolf, Greenfield & Sacks, P.C.

(57) ABSTRACT

Provided in the present disclosure are a positive electrode material used for a lithium ion battery. The positive electrode material comprises substrate particles, a first coating layer that covers the substrate particles, and a second coating layer that covers the first coating layer; the substrate particles contain $LiNi_xMn_yCo_zM_{1-x-y-z}O_2$; the first cladding layer contains lithium cobalt oxide; and the second coating layer contains an oxide of a transition metal.

19 Claims, No Drawings

POSITIVE ELECTRODE MATERIAL USED FOR LITHIUM ION BATTERY, PREPARATION METHOD THEREFOR, AND LITHIUM ION BATTERY

CROSS-REFERENCE TO RELATED APPLICATIONS

The present application claims the benefit under 35 U.S.C. § 371 as a U.S. National Stage Entry of International Application No. PCT/CN2020/123858, filed on Dec. 27, 2020, which claims priority to Chinese Patent Application Number 202010485860.4, filed with the China National Intellectual Property Administration (CNIPA) on Jun. 1, 2020, each of which applications is hereby incorporated by reference in its entirety.

TECHNICAL FIELD

The present disclosure relates to the field of materials, for example, to a positive electrode material for a lithium-ion battery and a preparation method thereof, and a lithium-ion battery.

BACKGROUND

Lithium-ion batteries have been widely used in electronic products, automobiles, aerospace, and other fields due to their high energy density and good cycle performance. Researchers have found that high-nickel positive electrode materials are gradually replacing $LiCoO_2$ positive electrode materials because of their high capacity and low price. However, the high-nickel positive electrode materials have poor cycle performance, and too high nickel content greatly reduces cycle performance and safety performance. In order to form a layered structure well, excess lithium source needs to be added in the synthesis process, and unreacted lithium oxide $Li_2O$ is produced after synthesis. Such an unreacted lithium oxide reacts with water and carbon dioxide in the air to form $LiOH$ and $Li_2CO_3$ which remain on the surface of the positive electrode material. The great increase of residual alkaline impurities on the surface of the high-nickel positive electrode material will cause serious gas production problems in the charge-discharge process of lithium-ion batteries, resulting in battery expansive deformation, short cycle shelf life, and potential safety hazards. Therefore, the high residual alkali content on the surface of the high-nickel positive electrode material has become one of the key factors restricting the application of the high-nickel positive electrode material in high-energy-density power batteries.

At present, one of the manners to reduce the residual alkali content on the surface of the positive electrode materials is to use metal oxides and metal fluorides as surface coating layers. For example, CN111106328A uses a metal oxide including cobalt, and a Group 2 element, a Group 12 element, a Group 13 element, or a combination thereof as the coating layer. CN109428074A uses a lithium cobalt composite oxide having a spinel crystal structure as the coating layer. CN106953070A and CN105280893A use a conductive material (a carbon-containing material, indium tin oxide, $RuO_2$, and ZnO), a metal oxide, and an inorganic fluoride as the coating layer.

However, the electrochemical performance of existing high-nickel positive electrode materials with a surface coating is still unsatisfactory.

SUMMARY

The summary of the subject matter described in detail herein is given below. This summary is not intended to limit the scope of the claims.

The present disclosure provides a positive electrode material for a lithium-ion battery and a preparation method thereof, and a lithium-ion battery.

The present disclosure provides a positive electrode material for a lithium-ion battery in an embodiment. The positive electrode material includes a matrix particle, a first coating layer coated on the matrix particle, and a second coating layer coated on the first coating layer; where the matrix particle contains $LiNi_xMn_yCo_zM_{1-x-y-z}2$, wherein x is greater than or equal to 0.80 and less than or equal to 0.90, y is greater than or equal to 0.02 and less than or equal to 0.05, z is greater than or equal to 0.05 and less than or equal to 0.1, and M is at least one of Mg, Ba, B, Al, Si, P, Ti, Zr or Nb; the first coating layer contains lithium cobaltate; the second coating layer contains an oxide of a transition metal.

In an embodiment, the content of the first coating layer is 0.1 to 1.5 parts by weight relative to 100 parts by weight of the matrix particle, and the content of the second coating layer is 0.1 to 1.0 parts by weight relative to 100 parts by weight of the matrix particle coated by the first coating layer.

In an embodiment, the content of the first coating layer is 0.3 to 0.9 parts by weight relative to 100 parts by weight of the matrix particle; the content of the second coating layer is 0.3 to 0.6 parts by weight relative to 100 parts by weight of the matrix particle coated by the first coating layer; the total thickness of the first coating layer and the second coating layer is 0.1 nm to 500 nm and is 1 nm to 200 nm in an embodiment.

In an embodiment, the matrix particle is at least one of a single crystal particle or a polycrystalline particle.

In an embodiment, the single crystal particle has a particle size of 0.1 μm to 5 μm.

In an embodiment, the single crystal particle has a particle size of 2 μm to 3 μm.

In an embodiment, the polycrystalline particle has a particle size of 5 μm to 15 μm.

In an embodiment, the polycrystalline particle has a particle size of 6 μm to 12 μm.

In an embodiment, the transition metal is at least one of ruthenium, rhodium, palladium, copper or molybdenum.

In an embodiment, the transition metal is ruthenium.

In an embodiment, the oxide of a transition metal is nanometer ruthenium oxide having a particle size of 10 nm to 50 nm.

In an embodiment, the positive electrode material has a specific surface area of 0.3 $m^2/g$ to 1.5 $m^2/g$.

In an embodiment, the positive electrode material has a specific surface area of 0.35 $m^2/g$ to 0.7 $m^2/g$.

The present disclosure provides a method for preparing a positive electrode material for a lithium-ion battery in an embodiment. The method includes the following steps:

S1, performing second mixing on a matrix particle and a first coating agent to obtain a second mixture;

S2, performing third mixing on the second mixture and a second coating agent to obtain a third mixture; and S3, performing second calcination on the third mixture.

The matrix particle contains $LiNi_xMn_yCo_zM_{1-x-y-z}O_2$, wherein x is greater than or equal to 0.80 and less than or equal to 0.90, y is greater than or equal to 0.02 and less than or equal to 0.05, z is greater than or equal to 0.05 and less than or equal to 0.1, and M is at least one of Mg, Ba, B, Al, Si, P, Ti, Zr or Nb; the first coating agent contains at least one of $Co(OH)_2$, $Co_3O_4$, $Co_2O_3$, CoO or $CoCO_3$; and the second coating agent contains an oxide of a transition metal.

In an embodiment, the first coating agent is used in an amount of 0.1 to 1.5 parts by weight relative to 100 parts by weight of the matrix particle, based on the amount of cobalt, and the second coating agent is used in an amount of 0.1 to 1.0 parts by weight relative to 100 parts by weight of the second mixture.

In an embodiment, the first coating agent is used in an amount of 0.3 to 0.9 parts by weight relative to 100 parts by weight of the matrix particle, and the second coating agent is used in an amount of 0.3 to 0.6 parts by weight relative to 100 parts by weight of the second mixture.

In an embodiment, in step S1, conditions for the second mixing include: a device for the mixing is a high-speed mixer, the mixing is performed at a rotational speed of 2000 rpm to 3000 rpm, the mixing is performed at a temperature of 20° C. to 30° C., and the mixing lasts for 15 minutes to 30 minutes.

In step S2, conditions for the third mixing include: a device for the mixing is a high-speed mixer, the mixing is performed at a rotational speed of 2000 rpm to 3000 rpm, the mixing is performed at a temperature of 20° C. to 30° C., and the mixing lasts for 15 minutes to 30 minutes.

In step S3, conditions of the second calcination include: the calcination is performed at a temperature of 450° C. to 650° C., the calcination lasts for 4 hours to 15 hours, and the calcination is performed in an atmosphere containing 20 volume % to 100 volume % oxygen.

In an embodiment, the matrix particle is at least one of a single crystal particle or a polycrystalline particle.

In an embodiment, the single crystal particle has a particle size of 0.1 μm to 5 μm.

In an embodiment, the single crystal particle has a particle size of 2 μm to 3 μm.

In an embodiment, the polycrystalline particle has a particle size of 5 μm to 15 μm.

In an embodiment, the polycrystalline particle has a particle size of 6 μm to 12 μm.

In an embodiment, the transition metal in the oxide of a transition metal in the second coating agent is at least one of ruthenium, rhodium, palladium, copper or molybdenum.

In an embodiment, the transition metal in the oxide of a transition metal in the second coating agent is ruthenium.

In an embodiment, the second coating agent contains nanometer ruthenium oxide having a particle size of 10 nm to 50 nm.

In an embodiment, the method further includes: crushing and sieving a material obtained from the second calcination.

In an embodiment, the sieving is performed by using a sieve with a sieve mesh of 300 to 400.

In an embodiment, the method further includes: preparing the matrix particle through the following steps:

SS1, performing first mixing on a lithium source and a precursor to obtain a first mixture; and SS2, performing first calcination on the first mixture, and crushing and sieving a material obtained from the first calcination.

In an embodiment, the lithium source is lithium hydroxide and the precursor contains $Ni_xMn_yCo_zM_{1-x-y-z}(OH)_2$, where x is greater than or equal to 0.80 and less than or equal to 0.90, y is greater than or equal to 0.02 and less than or equal to 0.05, z is greater than or equal to 0.05 and less than or equal to 0.1, and M is at least one of Mg, Ba, B, Al, Si, P, Ti, Zr or Nb.

The present disclosure provides a lithium-ion battery in an embodiment. The lithium-ion battery contains the preceding positive electrode material or a positive electrode material prepared by the preceding method.

The present disclosure provides a positive electrode material for a lithium-ion battery and a preparation method thereof. The positive electrode material for the lithium-ion battery can effectively reduce the alkali content on the surface of the positive electrode material, reduce the specific surface area of the positive electrode material, and improve the thermal stability of the positive electrode material, thereby improving the structural stability and electrochemical performance of the positive electrode material.

DETAILED DESCRIPTION

The technical solutions of the present disclosure are further described below through the specific embodiment.

The present disclosure provides a positive electrode material for a lithium-ion battery in an embodiment. The positive electrode material includes a matrix particle, a first coating layer coated on the matrix particle, and a second coating layer coated on the first coating layer; where the matrix particle contains $LiNi_xMn_yCo_zM_{1-x-y-z}O_2$, where x is greater than or equal to 0.80 and less than or equal to 0.90, y is greater than or equal to 0.02 and less than or equal to 0.05, z is greater than or equal to 0.05 and less than or equal to 0.1, and M is at least one of Mg, Ba, B, Al, Si, P, Ti, Zr or Nb; the first coating layer contains lithium cobaltate; the second coating layer contains an oxide of a transition metal. The positive electrode material for a lithium-ion battery provided by the present disclosure can effectively reduce the alkali content on the surface of the positive electrode material, reduce the specific surface area of the positive electrode material, and improve the thermal stability of the positive electrode material, thereby improving the structural stability and electrochemical performance of the positive electrode material.

In an embodiment, the content of the first coating layer may be 0.1 to 1.5 parts by weight relative to 100 parts by weight of the matrix particle, and the content of the second coating layer may be 0.1 to 1.0 parts by weight relative to 100 parts by weight of the matrix particle coated by the first coating layer. In an embodiment, the content of the first coating layer may be 0.3 to 0.9 parts by weight relative to 100 parts by weight of the matrix particle; the content of the second coating layer may be 0.3 to 0.6 parts by weight relative to 100 parts by weight of the matrix particle coated by the first coating layer; the total thickness of the first coating layer and the second coating layer may be 0.1 nm to 500 nm and is 1 nm to 200 nm in an embodiment.

In an embodiment, the matrix particle may be at least one of a single crystal particle or a polycrystalline particle.

In an embodiment, the single crystal particle may have a particle size of 0.1 μm to 5 μm.

In an embodiment, the single crystal particle may have a particle size of 2 μm to 3 μm.

In an embodiment, the polycrystalline particle may have a particle size of 5 μm to 15 μm.

In an embodiment, the polycrystalline particle has a particle size of 6 μm to 12 μm.

In an embodiment, the transition metal may be at least one of ruthenium, rhodium, palladium, copper or molybdenum.

In an embodiment, the transition metal is ruthenium.

In an embodiment, the oxide of a transition metal is nanometer ruthenium oxide having a particle size of 10 nm to 50 nm.

In an embodiment, the positive electrode material has a specific surface area of 0.3 $m^2/g$ to 1.5 $m^2/g$.

In an embodiment, the positive electrode material has a specific surface area of 0.35 m²/g to 0.7 m²/g.

The present disclosure provides a method for preparing a positive electrode material for a lithium-ion battery in an embodiment. The method includes the following steps.

In S1, second mixing is performed on a matrix particle and a first coating agent to obtain a second mixture.

In S2, third mixing is performed on the second mixture and a second coating agent to obtain a third mixture.

In S3, second calcination is performed on the third mixture.

The matrix particle contains $LiNi_xMn_yCo_zM_{1-x-y-z}O_2$, where x is greater than or equal to 0.80 and less than or equal to 0.90, y is greater than or equal to 0.02 and less than or equal to 0.05, z is greater than or equal to 0.05 and less than or equal to 0.1, and M is at least one of Mg, Ba, B, Al, Si, P, Ti, Zr or Nb; the first coating agent contains at least one of $Co(OH)_2$, $Co_3O_4$, $Co_2O_3$, CoO or $CoCO_3$; the second coating agent contains an oxide of a transition metal.

In an embodiment, the first coating agent containing cobalt can react with residual lithium on the surface of the matrix particle, which on the one hand, can reduce the residual lithium content on the surface of the matrix particle and ensure the capacity of the matrix particle, and on the other hand, save the water-washing process and reduce the cost. The second coating agent containing a transition metal can effectively reduce the specific surface area of the material, reduce the side reaction between an electrolyte and the matrix material at the interface, and improve the thermal stability and structural stability of the material.

In an embodiment, the first coating agent may be used in an amount of 0.1 to 1.5 parts by weight relative to 100 parts by weight of the matrix particle, and the second coating agent may be used in an amount of 0.1 to 1.0 parts by weight relative to 100 parts by weight of the second mixture. In an embodiment, the first coating agent may be used in an amount of 0.3 to 0.9 parts by weight relative to 100 parts by weight of the matrix particle, and the second coating agent may be used in an amount of 0.3 to 0.6 parts by weight relative to 100 parts by weight of the second mixture.

In an embodiment, in step S1, conditions for the second mixing may include: a device for the mixing is a high-speed mixer, the mixing is performed at a rotational speed of 2000 rpm to 3000 rpm, the mixing is performed at a temperature of 20° C. to 30° C., and the mixing lasts for 15 minutes to 30 minutes; in step S2, conditions for the third mixing may include: a device for the mixing is a high-speed mixer, the mixing is performed at a rotational speed of 2000 rpm to 3000 rpm, the mixing is performed at a temperature of 20° C. to 30° C., and the mixing lasts for 15 minutes to 30 minutes; in step S3, conditions of the second calcination may include: the calcination is performed at a temperature of 450° C. to 650° C., the calcination lasts for 4 hours to 15 hours, and the calcination is performed in an atmosphere containing 20 volume % to 100 volume % oxygen.

In an embodiment, the matrix particle may be at least one of a single crystal particle or a polycrystalline particle.

In an embodiment, the single crystal particle may have a particle size of 0.1 μm to 5 μm.

In an embodiment, the single crystal particle has a particle size of 2 μm to 3 μm.

In an embodiment, the polycrystalline particle may have a particle size of 5 μm to 15 μm.

In an embodiment, the polycrystalline particle has a particle size of 6 μm to 12 μm.

In an embodiment, the transition metal in the oxide of a transition metal in the second coating agent may be at least one of ruthenium, rhodium, palladium, copper or molybdenum.

In an embodiment, the transition metal in the oxide of a transition metal in the second coating agent is ruthenium.

In an embodiment, the second coating agent contains nanometer ruthenium oxide having a particle size of 10 nm to 50 nm.

In an embodiment, the method further includes: crushing and sieving a material obtained from the second calcination.

In an embodiment, sieving is performed by using a sieve with a sieve mesh of 300 to 400.

In an embodiment, the method may further include: preparing the matrix particle through the following steps.

In SS1, first mixing is performed on a lithium source and a precursor to obtain a first mixture.

In SS2, first calcination is performed on the first mixture, and a material obtained from the first calcination is crushed and sieved.

In an embodiment, the lithium source may be lithium hydroxide and the precursor may contain $Ni_xMn_yCo_zM_{1-x-y-z}(OH)_2$, where x is greater than or equal to 0.80 and less than or equal to 0.90, y is greater than or equal to 0.02 and less than or equal to 0.05, z is greater than or equal to 0.05 and less than or equal to 0.1, and M is at least one of Mg, Ba, B, Al, Si, P, Ti, Zr or Nb.

The present disclosure provides a lithium-ion battery in an embodiment. The lithium-ion battery contains the preceding positive electrode material or a positive electrode material prepared by the preceding method.

In the present disclosure, the coating layers of the double-layer coating are relatively uniform and complete, which can reduce the residual alkali amount, facilitate the inhibition of the gas production of the material, and improve the cycle stability and safety. The specific surface area of the positive electrode material is significantly reduced, which facilitates the reduction of the side reaction between the electrolyte and the matrix material at the interface, reduces particle breakage, and improves thermal stability.

The present disclosure is further described below through specific examples, but the examples described below are not intended to limit the technical solutions of the present disclosure. All the raw materials used in the following examples are commercially available.

Example 1

A precursor $Ni_aCo_bMn_cAl_d(OH)_2$ (a=0.88, b=0.06, c=0.03, and d=0.03) and LiOH were mixed in a molar ratio of 1:1.03 to obtain a first mixture. First calcination was performed on the first mixture, and a material obtained from the first calcination was cooled and then crushed and sieved to obtain a matrix particle. The conditions of the first calcination were as follows: sintering was performed at 840° C. for 8 hours in an oxygen atmosphere, and then sintering was performed at 750° C. for 6 hours.

Second mixing was performed on the matrix particle and $Co(OH)_2$ in a mass ratio of 100:0.9 to obtain a second mixture. Third mixing was performed on the second mixture and nano $RuO_2$ in a mass ratio of 100:0.3 to obtain a third mixture. Second calcination was performed on the third mixture, and a product of the second calcination was cooled and then crushed and sieved to obtain the positive electrode material of this example. The conditions of the second mixing were as follows: the mixing was performed by using a high-speed mixer at a rotational speed of 2000 rpm at 25±5° C. for 15 minutes. The conditions of the third mixing were as follows: the mixing was performed by using a high-speed mixer at a rotational speed of 2000 rpm at 25±5° C. for 15 minutes. The conditions of the second calcination were as follows: sintering was performed in an oxygen atmosphere at 600° C. for 10 hours.

Example 2

The method of preparing the positive electrode material in this example is the same as the method in Example 1, except that in this example, the mass ratio of the matrix particle to $Co(OH)_2$ in the second mixing was 100:0.2 and the mass ratio of the second mixture to nano $RuO_2$ in the third mixing was 100:0.1.

Example 3

The method of preparing the positive electrode material in this example is the same as the method in Example 1, except that in this example, the mass ratio of the matrix particle to $Co(OH)_2$ in the second mixing was 100:0.3 and the mass ratio of the second mixture to nano $RuO_2$ in the third mixing was 100:0.2.

Example 4

The method of preparing the positive electrode material in this example is the same as the method in Example 1, except that in this example, the mass ratio of the matrix particle to $Co(OH)_2$ in the second mixing was 100:0.7 and the mass ratio of the second mixture to nano $RuO_2$ in the third mixing was 100:0.5.

Example 5

The method of preparing the positive electrode material in this example is the same as the method in Example 1, except that in this example, the mass ratio of the matrix particle to $Co(OH)_2$ in the second mixing was 100:1.0; the mass ratio of the second mixture to nano $RuO_2$ in the third mixing was 100:0.7; the conditions of the second mixing were as follows: the mixing was performed by using a high-speed mixer at a rotational speed of 2500 rpm at 25±5° C. for 20 minutes; the conditions of the third mixing were as follows: the mixing was performed by using a high-speed mixer at a rotational speed of 2500 rpm at 25±5° C. for 20 minutes; the conditions of the second calcination were as follows: sintering was performed in an oxygen atmosphere at 600° C. for 10 hours.

Example 6

The method of preparing the positive electrode material in this example is the same as the method in Example 1, except that in this example, the mass ratio of the matrix particle to $Co(OH)_2$ in the second mixing was 100:1.2; the mass ratio of the second mixture to nano $RuO_2$ in the third mixing was 100:1.0; the conditions of the second mixing were as follows: the mixing was performed by using a high-speed mixer at a rotational speed of 2500 rpm at 25±5° C. for 20 minutes; the conditions of the third mixing were as follows: the mixing was performed by using a high-speed mixer at a rotational speed of 2500 rpm at 25±5° C. for 20 minutes; the conditions of the second calcination were as follows: sintering was performed in an oxygen atmosphere at 600° C. for 10 hours.

Example 7

The method of preparing the positive electrode material in this example is the same as the method in Example 1, except that in this example, the precursor was $Ni_a Co_b Mn_c Al_d (OH)_2$ (a=0.90, b=0.07, c=0.02, and d=0.03) and the precursor and LiOH were mixed in a molar ratio of 1:1.03 to prepare the matrix particle. The conditions of the first calcination were as follows: sintering was performed at 840° C. for 8 hours in an oxygen atmosphere, and then sintering was performed at 750° C. for 6 hours.

Second mixing was performed on the matrix particle and $Co(OH)_2$ in a mass ratio of 100:0.9 to obtain a second mixture. Third mixing was performed on the second mixture and nano $RuO_2$ in a mass ratio of 100:0.3 to obtain a third mixture. Second calcination was performed on the third mixture, and a product of the second calcination was cooled and then crushed and sieved to obtain the positive electrode material of this example. The conditions of the second mixing were as follows: the mixing was performed by using a high-speed mixer at a rotational speed of 2000 rpm at 25±5° C. for 15 minutes. The conditions of the third mixing were as follows: the mixing was performed by using a high-speed mixer at a rotational speed of 2000 rpm at 25±5° C. for 15 minutes. The conditions of the second calcination were as follows: sintering was performed in an oxygen atmosphere at 600° C. for 10 hours.

Comparative Example 1

A precursor $Ni_a Co_b Mn_c Al_d (OH)_2$ (a=0.88, b=0.06, c=0.03, and d=0.03) and LiOH were mixed in a molar ratio of 1:1.03 to obtain a first mixture. First calcination was performed on the first mixture, and a material obtained from the first calcination was cooled and then crushed and sieved to obtain the positive electrode material of this comparative example. The conditions of the first calcination were as follows: sintering was performed at 840° C. for 8 hours in an oxygen atmosphere, and then sintering was performed at 750° C. for 6 hours.

Comparative Example 2

A precursor $Ni_a Co_b Mn_c Al_d (OH)_2$ (a=0.88, b=0.06, c=0.03, and d=0.03) and LiOH were mixed in a molar ratio of 1:1.03 to obtain a first mixture. First calcination was performed on the first mixture, and a material obtained from the first calcination was cooled and then crushed and sieved to obtain a matrix particle. The conditions of the first calcination were as follows: sintering was performed at 840° C. for 8 hours in an oxygen atmosphere, and then sintering was performed at 750° C. for 6 hours.

Second mixing was performed on the matrix particle and $Co(OH)_2$ in a mass ratio of 100:0.9 to obtain a second mixture. Second calcination was performed on the second mixture, and a product of the second calcination was cooled and then crushed and sieved to obtain the positive electrode material of this example. The conditions of the second mixing were as follows: the mixing was performed by using a high-speed mixer at a rotational speed of 2000 rpm at 25±5° C. for 15 minutes. The conditions of the second calcination were as follows: sintering was performed in an oxygen atmosphere at 600° C. for 10 hours.

Comparative Example 3

A precursor $Ni_a Co_b Mn_c Al_d (OH)_2$ (a=0.88, b=0.06, c=0.03, and d=0.03) and LiOH were mixed in a molar ratio of 1:1.03 to obtain a first mixture. First calcination was performed on the first mixture, and a material obtained from the first calcination was cooled and then crushed and sieved to obtain a matrix particle. The conditions of the first calcination were as follows: sintering was performed at 840° C. for 8 hours in an oxygen atmosphere, and then sintering was performed at 750° C. for 6 hours.

Second mixing was performed on the matrix particle and $RuO_2$ in a mass ratio of 100:0.3 to obtain a second mixture. Second calcination was performed on the second mixture, and a product of the second calcination was cooled and then crushed and sieved to obtain the positive electrode material of this example. The conditions of the second mixing were as follows: the mixing was performed by using a high-speed mixer at a rotational speed of 2000 rpm at 25±5° C. for 15 minutes. The conditions of the second calcination were as follows: sintering was performed in an oxygen atmosphere at 600° C. for 10 hours.

Test Example 1

The crystalline form and particle size of the matrix particles in the positive electrode materials prepared in Examples 1 to 7 and Comparative Examples 1 to 3, the part by weight of the first coating layer relative to 100 parts by weight of the matrix particle, the part by weight of the second coating layer relative to 100 parts by weight of the matrix particle coated by the first coating layer, the total thickness of the first coating layer and the second coating layer, and the specific surface area of the positive electrode material were measured by specifically using an X-ray diffractometer (XRD) and a high resolution scanning electron microscope (SEM). The measurement results are shown in Table 1.

TABLE 1

| Group No. | Crystalline form of the matrix particle | Particle size of the matrix particle (μm) | Part by weight of the first coating layer | Part by weight of the second coating layer | Total thickness of the first coating layer and the second coating layer (nm) |
|---|---|---|---|---|---|
| Example 1 | crystal | 2.5 ± 0.2 | 0.9 | 0.3 | 2.1 |
| Example 2 | crystal | 2.5 ± 0.2 | 0.2 | 0.1 | 1.3 |
| Example 3 | crystal | 2.5 ± 0.2 | 0.3 | 0.2 | 1.5 |
| Example 4 | crystal | 2.5 ± 0.2 | 0.7 | 0.5 | 2.3 |
| Example 5 | crystal | 2.5 ± 0.2 | 1.0 | 0.7 | 3.2 |
| Example 6 | crystal | 2.5 ± 0.2 | 1.2 | 1.0 | 4.5 |
| Example 7 | crystal | 3.0 ± 0.2 | 0.9 | 0.3 | 2.5 |
| Comparative Example 1 | crystal | 2.5 ± 0.2 | 0 | 0 | 0 |
| Comparative Example 2 | crystal | 2.5 ± 0.2 | 0.9 | 0 | 1.1 |
| Comparative Example 3 | crystal | 2.5 ± 0.2 | 0 | 0.3 | 0.6 |

As can be seen from Table 1, the thickness of the coating layers was between 0.5 nm and 4.5 nm.

Test Example 2

The amount of residual alkali ($Li_2CO_3$ and LiOH) in the positive electrode materials prepared in Examples 1 to 7 and Comparative Examples 1 to 3 and the specific surface area of the positive electrode materials were measured by chemical titration analysis and specific surface area analysis. The specific results are shown in Table 2.

TABLE 2

| Group No. | $Li_2CO_3$ content | LiOH content | Content of $Li_2CO_3$ and LiOH | Specific surface area of the positive electrode material |
|---|---|---|---|---|
| Example 1 | 0.22 | 0.16 | 0.38 | 0.37 |
| Example 2 | 0.35 | 0.36 | 0.71 | 0.39 |
| Example 3 | 0.31 | 0.32 | 0.62 | 0.40 |
| Example 4 | 0.26 | 0.26 | 0.52 | 0.42 |
| Example 5 | 0.19 | 0.15 | 0.34 | 0.43 |
| Example 6 | 0.17 | 0.14 | 0.31 | 0.46 |
| Example 7 | 0.26 | 0.28 | 0.44 | 0.50 |
| Comparative Example 1 | 0.41 | 1.81 | 2.22 | 1.23 |
| Comparative Example 2 | 0.33 | 0.40 | 0.73 | 0.65 |
| Comparative Example 3 | 0.45 | 0.56 | 1.01 | 0.7 |

As can be seen from Table 2, the residual alkali content and specific surface area of positive electrode materials after coated were significantly reduced compared with that of Comparative Example 1.

Test Example 3

DSC measurement was performed on the positive electrode materials prepared in Examples 1 to 7 and Comparative Examples 1 to 3 by TG-thermogravimetric analysis. The test results are shown in Table 3.

TABLE 3

| Group No. | DSC temperature (° C.) |
|---|---|
| Example 1 | 235 |
| Example 2 | 208 |
| Example 3 | 210 |
| Example 4 | 213 |
| Example 5 | 230 |
| Example 6 | 238 |
| Example 7 | 223 |
| Comparative Example 1 | 192 |
| Comparative Example 2 | 209 |
| Comparative Example 3 | 198 |

As can be seen from Table 3, the DSC temperature value is the exothermic peak temperature of the reaction between the positive electrode material and the electrolyte, and the higher the value, the better the thermal stability and safety of the positive electrode material. As can be seen from the test data in the table, the thermal stability of the positive electrode material after coated was significantly improved compared with that of Comparative Example 1. Example 7 suggested that with the increase of Ni content in the positive electrode material, the structural stability became poor. The double-layer coating of the present disclosure is more beneficial to improving the structural stability of materials.

Test Example 4

The positive electrode material layers prepared in Examples 1 to 7 and Comparative Examples 1 to 3 were used to prepare positive electrode material layers, and the prepared positive electrode material layers were respectively pressed with an electrolyte and a negative electrode plate to obtain batteries. Ten batteries in each of Examples 1 to 7 and Comparative Examples 1 to 3 were tested at 25° C. on a LAND battery test device at a test voltage ranging from 2.7 V to 4.3 V. The battery was tested for the charge-discharge cycle test at a discharge efficiency of 0.1 C. After two cycles, the battery was tested for the charge-discharge test at 1 C for 50 cycles and then retested for the charge-discharge cycle test at 0.1 C for two cycles. Then the test stopped. The average value of each group of batteries was calculated, and the data of average initial discharge specific capacity, average initial discharge efficiency, and cycle retention rate at room temperature of the battery are shown in Table 4. The specific steps of preparing the battery were as follows: the prepared quaternary positive electrode material, a conductive agent, and a binder were prepared into a slurry according to a certain proportion, the slurry was coated on aluminum foil, vacuum drying and rolling were performed on the aluminum foil to form a positive electrode plate, the negative electrode plate was prepared by using a lithium metal sheet, the electrolyte including lithium hexafluorophosphate ($LiPF_6$) solution with a concentration of 1.15 M was prepared by using a mixed solvent of ethylene carbonate (EC) and dimethyl carbonate (DMC) at a volume ratio of EC to DMC of 1:1, and a button battery was assembled.

TABLE 4

| Group No. | Initial discharge specific capacity (based on the overall mass of the positive electrode material, mAh/g) | Initial discharge efficiency (%) | 50-cycle retention rate (%) |
| --- | --- | --- | --- |
| Example 1 | 215 | 92.3 | 97.53 |
| Example 2 | 198 | 88.3 | 88.65 |
| Example 3 | 201 | 89.6 | 88.92 |
| Example 4 | 205 | 90.3 | 95.32 |
| Example 5 | 210 | 90.9 | 97.85 |
| Example 6 | 216 | 92.6 | 96.98 |
| Example 7 | 216 | 92.5 | 89.65 |
| Comparative Example 1 | 185 | 83.9 | 86.49 |
| Comparative Example 2 | 196 | 87.4 | 88.12 |
| Comparative Example 3 | 191 | 86.5 | 87.07 |

As can be seen from Table 4, the electrochemical performance of the double-layer coated positive electrode material of the present disclosure is superior to that of the positive electrode material of Comparative Example 1 which is not coated and is also higher than that of the single-layer coated positive electrode materials of Comparative Examples 2 and 3. In a case where the content of the first coating layer is 0.1 to 1.5 parts by weight relative to 100 parts by weight of the matrix particle and the content of the second coating layer is 0.1 to 1.0 parts by weight relative to 100 parts by weight of the matrix particle coated by the first coating layer, the electrochemical performance of the positive electrode material is better.

What is claimed is:

1. A positive electrode material for a lithium-ion battery, comprising: a matrix particle, a first coating layer coated on the matrix particle, and a second coating layer coated on the first coating layer;
   the matrix particle contains $LiNi_xMn_yCO_zM_{1-x-y-z}O_2$, wherein x is greater than or equal to 0.80 and less than or equal to 0.90, y is greater than or equal to 0.02 and less than or equal to 0.05, z is greater than or equal to 0.05 and less than or equal to 0.1, and M is at least one of Mg, Ba, B, Al, Si, P, Ti, Zr or Nb; and
   the first coating layer contains lithium cobaltate, and the second coating layer contains an oxide of a transition metal wherein the transition metal is at least one of ruthenium, rhodium, palladium, copper or molybdenum.

2. The positive electrode material according to claim 1, wherein the content of the first coating layer is 0.1 to 1.5 parts by weight relative to 100 parts by weight of the matrix particle, and the content of the second coating layer is 0.1 to 1.0 parts by weight relative to 100 parts by weight of the matrix particle coated by the first coating layer.

3. The positive electrode material according to claim 1, wherein the total thickness of the first coating layer and the second coating layer is 0.1 nm to 500 nm.

4. The positive electrode material according to claim 1, wherein the matrix particle is at least one of a single crystal particle or a polycrystalline particle.

5. The positive electrode material according to claim 4, wherein the single crystal particle has a particle size of 0.1 µm to 5µ; the polycrystalline particle has a particle size of 5 µm to 15 µm.

6. The positive electrode material according to claim 1, wherein the oxide of a transition metal is nanometer ruthenium oxide having a particle size of 10 nm to 50 nm.

7. The positive electrode material according to claim 1, wherein the positive electrode material has a specific surface area of 0.3 m2/g to 1.5 m2/g.

8. A method of preparing the positive electrode material for a lithium-ion battery according to claim 1, comprising: preparing the matrix particle through the following steps:
   SS1, performing first mixing on a lithium source and a precursor to obtain a first mixture; and
   SS2, performing first calcination on the first mixture, and crushing and sieving a material obtained from the first calcination.

9. The method according to claim 8, wherein the lithium source is lithium hydroxide and the precursor contains $Ni_xMn_yCO_zM_{1-x-y-z}(OH)_2$, wherein x is greater than or equal to 0.80 and less than or equal to 0.90, y is greater than or equal to 0.02 and less than or equal to 0.05, z is greater than or equal to 0.05 and less than or equal to 0.1, and M is at least one of Mg, Ba, B, Al, Si, P, Ti, Zr or Nb.

10. A lithium-ion battery, comprising the positive electrode material according to claim 1.

11. The method according to claim 8, further comprising the following steps:
   S1, performing second mixing on the matrix particle and a first coating agent to obtain a second mixture;
   S2, performing third mixing on the second mixture and a second coating agent to obtain a third mixture; and
   S3, performing second calcination on the third mixture;
   the matrix particle contains $LiNi_xMn_yCO_zM_{1-x-y-z}O_2$, wherein x is greater than or equal to 0.80 and less than or equal to 0.90, y is greater than or equal to 0.02 and less than or equal to 0.05, z is greater than or equal to 0.05 and less than or equal to 0.1, and M is at least one of Mg, Ba, B, Al, Si, P, Ti, Zr or Nb; and the first coating agent contains at least one of $Co(OH)_2$, $Co_3O_4$, $Co_2O_3$, CoO or $CoCO_3$, and the second coating agent contains an oxide of a transition metal.

12. The method according to claim 11, wherein the first coating agent is used in an amount of 0.1 to 1.5 parts by weight relative to 100 parts by weight of the matrix particle, and the second coating agent is used in an amount of 0.1 to 1.0 parts by weight relative to 100 parts by weight of the second mixture.

13. The method according to 11, wherein in step S1, conditions for the second mixing comprise: a device for the mixing is a high-speed mixer, the mixing is performed at a rotational speed of 2000 rpm to 3000 rpm, the mixing is performed at a temperature of 20° C. to 30° C., and the mixing lasts for 15 minutes to 30 minutes; in step S2, conditions for the third mixing comprise: a device for the mixing is a high-speed mixer, the mixing is performed at a rotational speed of 2000 rpm to 3000 rpm, the mixing is performed at a temperature of 20° C. to 30° C., and the mixing lasts for 15 minutes to 30 minutes; and in step S3, conditions of the second calcination comprise: the calcination is performed at a temperature of 450° C. to 650° C., the calcination lasts for 4 hours to 15 hours, and the calcination is performed in an atmosphere containing 20 volume % to 100 volume % oxygen.

14. The method according to 11, wherein the matrix particle is at least one of a single crystal particle or a polycrystalline particle.

15. The method according to 14, wherein the single crystal particle has a particle size of 0.1 μm to 5 μm; the polycrystalline particle has a particle size of 5 μm to 15 μm.

16. The method according to 11, wherein the transition metal in the oxide of a transition metal in the second coating agent is at least one of ruthenium, rhodium, palladium, copper or molybdenum.

17. The method according to 11, wherein the second coating agent contains nanometer ruthenium oxide having a particle size of 10 nm to 50 nm.

18. The method according to 11, further comprising: crushing and sieving a material obtained from the second calcination.

19. The method according to 18, wherein the sieving is performed by using a sieve with a sieve mesh of 300 to 400.

* * * * *